(12) United States Patent
Pauli

(10) Patent No.: US 10,395,445 B2
(45) Date of Patent: Aug. 27, 2019

(54) SYSTEM AND METHOD FOR MONITORING PAYLOAD DISTRIBUTION AND MACHINE INCLUDING SAME

(71) Applicant: Caterpillar Inc., Peoria, IL (US)

(72) Inventor: Nathan S. Pauli, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 194 days.

(21) Appl. No.: 15/382,043

(22) Filed: Dec. 16, 2016

(65) Prior Publication Data

US 2018/0174382 A1 Jun. 21, 2018

(51) Int. Cl.

| | |
|---|---|
| *G07C 5/08* | (2006.01) |
| *G01S 19/08* | (2010.01) |
| *G01S 19/42* | (2010.01) |
| *G01M 1/12* | (2006.01) |
| *B60G 3/26* | (2006.01) |

(Continued)

(52) U.S. Cl.
CPC ............ *G07C 5/0825* (2013.01); *B60G 3/265* (2013.01); *B60G 17/017* (2013.01); *G01G 19/08* (2013.01); *G01M 1/122* (2013.01); *G01S 19/42* (2013.01); *G07C 5/085* (2013.01); *B60G 2200/17* (2013.01); *B60G 2300/02* (2013.01); *B60G 2300/09* (2013.01); *B60G 2400/61* (2013.01); *B60G 2400/824* (2013.01); *B60G 2401/16* (2013.01); *B60G 2800/912* (2013.01)

(58) Field of Classification Search
CPC ...... G07C 5/0825; G07C 5/085; B60G 3/265; B60G 17/017; B60G 2200/17; B60G 2300/02; B60G 2300/09; B60G 2400/61; B60G 2400/824; B60G 2401/16; B60G 2800/912; B60G 2600/042; B60G 2800/915; G01G 19/08; G01G 23/32; G01M 1/14; G01S 19/42
USPC .................................. 701/124, 37; 177/136
See application file for complete search history.

(56) References Cited

U.S. PATENT DOCUMENTS

| | | |
|---|---|---|
| 4,691,792 A | 9/1987 | Shintani |
| 4,835,719 A | 5/1989 | Sorrells |

(Continued)

FOREIGN PATENT DOCUMENTS

EP 2208971 A1 7/2010

*Primary Examiner* — Bao Long T Nguyen
(74) *Attorney, Agent, or Firm* — Leydig, Voit & Mayer, Ltd.

(57) ABSTRACT

A machine includes a frame, a suspension system mounted to the frame and including a plurality of struts, and a payload distribution monitoring system supported by the frame. The payload distribution monitoring system includes pressure sensors respectively arranged with the struts, a computer-readable medium bearing a payload distribution monitoring program, a controller, and an interface device. The controller is in operable communication with the pressure sensors to receive their signals and configured to execute the payload distribution monitoring program. The interface device is in operable communication with the controller and configured to display the payload distribution monitoring program's graphical user interface. The payload distribution monitoring program is configured to monitor the strut pressure signals for an unbalanced loading condition that occurs when a relative strut pressure differential, which is computed using the strut pressure signals from the pressure sensors, exceeds a differential limit.

15 Claims, 7 Drawing Sheets

(51) Int. Cl.
*G01G 19/08* (2006.01)
*B60G 17/017* (2006.01)

(56) References Cited

U.S. PATENT DOCUMENTS

| | | | |
|---|---|---|---|
| 4,852,674 A | 8/1989 | Gudat | |
| 4,887,454 A | 12/1989 | Krytsos et al. | |
| 5,531,122 A | 7/1996 | Chatham et al. | |
| 6,157,889 A * | 12/2000 | Baker | G01G 19/12 |
| | | | 37/348 |
| 6,293,141 B1 | 9/2001 | Nance | |
| 7,072,763 B2 * | 7/2006 | Saxon | G01G 19/086 |
| | | | 177/136 |
| 8,386,134 B2 * | 2/2013 | Morey | G01G 19/10 |
| | | | 172/430 |
| 9,285,007 B2 | 3/2016 | Fazeli et al. | |
| 2004/0129834 A1 | 7/2004 | Luce | |
| 2005/0278089 A1 | 12/2005 | Lueschow | |
| 2006/0144997 A1 | 7/2006 | Schmidt et al. | |
| 2006/0152352 A1 | 7/2006 | Moughler | |
| 2006/0207809 A1 | 9/2006 | Casey | |
| 2008/0004763 A1 | 1/2008 | Johnson et al. | |
| 2009/0289812 A1 | 11/2009 | Kim et al. | |
| 2011/0148856 A1 | 6/2011 | Sprock et al. | |
| 2011/0153214 A1 | 6/2011 | Sprock et al. | |
| 2012/0053783 A1 | 3/2012 | Nance | |
| 2012/0053784 A1 | 3/2012 | Schmidt et al. | |
| 2014/0088822 A1 | 3/2014 | Jensen | |
| 2014/0309850 A1 | 10/2014 | Gabibulayev | |
| 2015/0020609 A1 | 1/2015 | Gogolin | |
| 2015/0269794 A1 | 9/2015 | Fazeli et al. | |
| 2015/0291177 A1 | 10/2015 | Lee | |
| 2015/0367963 A1 | 12/2015 | Swearingen et al. | |
| 2016/0035149 A1 | 2/2016 | Friend | |
| 2016/0069675 A1 | 3/2016 | Bando et al. | |
| 2016/0196749 A1 | 7/2016 | Chen et al. | |
| 2016/0223387 A1 | 8/2016 | Talmaki et al. | |
| 2016/0334798 A1 | 11/2016 | Foster et al. | |

* cited by examiner

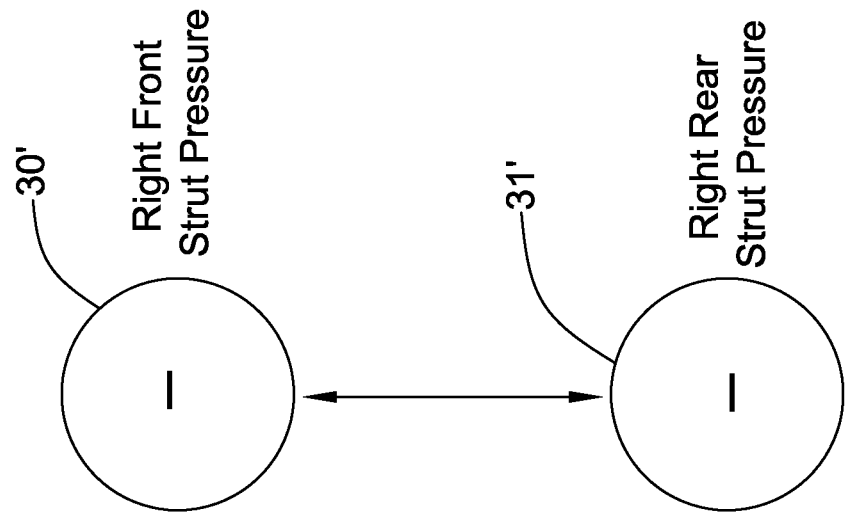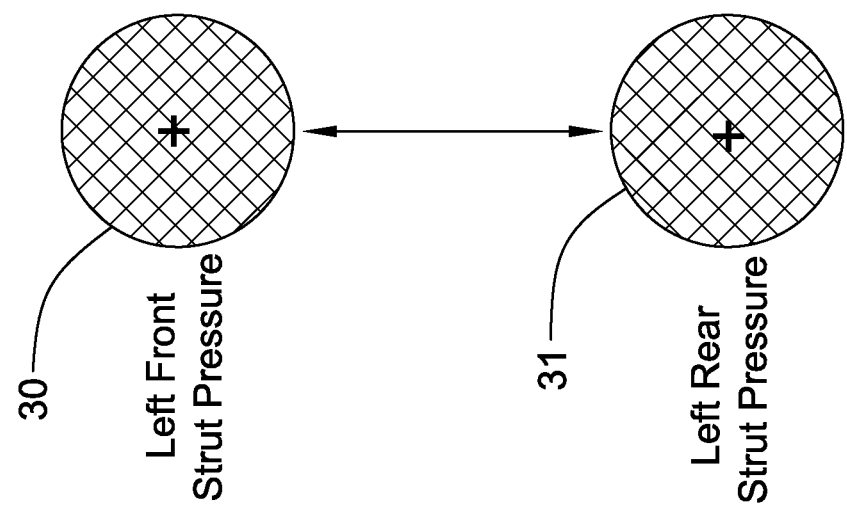
FIG. 6

SYSTEM AND METHOD FOR MONITORING PAYLOAD DISTRIBUTION AND MACHINE INCLUDING SAME

TECHNICAL FIELD

This patent disclosure relates generally to systems and methods for monitoring a machine and, more particularly, to systems and methods for monitoring a distribution of payload stored within a machine at a worksite.

BACKGROUND

Off-highway machines are in widespread use in construction, mining, forestry, and other similar industries. Such machines can be used to transport material, such as, for example, ore, overburden, rock, sand, dirt, or gravel, from one location to another. In a typical loading cycle at a worksite, a hauling machine receives material in its dump body at one location via a loading machine. The hauling machine can be situated with respect to the loading machine (in a process typically referred to as "spotting") using a variety of techniques, such as by manually sighting the hauling machine under a raised bucket of the loading machine or by using an automated positioning technique, for example. Once loaded, the hauling machine departs from the loading machine to haul the material in its body along a haul road to a second location at the worksite, and then dumps the material at the second location. In the meantime, a second hauling machine takes its place and receives therein more material from the loading machine. At a given location at a worksite, a number of different machines can repeatedly perform this loading cycle in a serial fashion.

The conditions in which these machines are used can be severe. The worksite's haul roads may have ruts, potholes, large rocks, or other obstacles or hazards scattered about their paths. Because these machines typically haul very heavy loads, load imbalances can contribute to fatigue failure by causing twisting actions of the machine's frame and other structural components as it travels from one location to another at the worksite. When a machine with an unbalanced load encounters an obstacle (such as a bump or pothole, e.g.) along a haul road, the frame of the machine can be subjected to even more twisting and other structurally-damaging forces that can cause the structural components of the machine to fail prematurely. Load imbalances can cause further damage during dumping of the material.

As hauling conditions of a worksite become more and more severe, the expected life of the structural components of the machine decreases. It would be very helpful for worksite management to be informed when a machine is being used at the worksite such that its expected life is being reduced.

Knowledge of potentially damaging worksite conditions would be useful to not only worksite managers, but also machine operators. For example, the driver of a hauling machine could decrease the speed of the hauling machine when alerted to an unbalanced loading condition until the load can be dumped from the machine or the unbalanced loading condition is otherwise resolved. Furthermore, if an operator of a loading machine used to load material in the hauling machine is notified that he is loading the hauling machine in an unbalanced manner, then he can strive to improve the balanced placement of subsequent loads.

U.S. Pat. No. 4,887,454 is entitled, "Method for Monitoring a Work Vehicle Suspension" and is directed to a system and method monitoring the struts of a machine's suspension system. The struts contribute to the proper operation of the vehicle such that a single collapsed strut can have serious manifestations in structural damage, tire wear, and payload monitor accuracy. These consequences can be mitigated by an accurate and reliable strut monitor. According to the '454 patent, pressure type sensors are disposed on each of the struts and their pressure is monitored during three critical phases of operation. These phases include static, loading, and roading modes and each mode requires a distinct method for detecting a collapsing strut. The presence of a collapsing strut, detected by any of the three methods, is communicated to the vehicle operator whereby operation can be immediately suspended. Although the strut monitoring system of the '454 patent is effective in monitoring for strut failure, there is a continued need in the art to provide additional solutions to enhance the ability to monitor loading conditions of a machine to help reduce the occurrence of machine damage caused by unbalanced loading conditions at the worksite and to help identify locations at the worksite that can be improved to help mitigate unbalanced loading conditions.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect of the present disclosure, embodiments of a machine are described. In one embodiment, the machine includes a frame, a body, a suspension system, and a payload distribution monitoring system.

The frame has a front end, a rear end in opposing relationship to the front end, a first side, and a second side in opposing relationship to the first side. The body is mounted to the frame. The body includes a payload support surface defining a payload storage area configured to hold a supply of material therein.

The suspension system is mounted to the frame and includes a first front strut, a second front strut, a first rear strut, and a second rear strut. The first front strut and the second front strut are disposed adjacent the front end of the frame and on the first side and the second side of the frame, respectively. The first rear strut and the second rear strut are disposed adjacent the rear end of the frame and on the first side and the second side of the frame, respectively. The first front strut, the second front strut, the first rear strut, and the second rear strut are placed in supporting relationship with the body to support the supply of material disposed within the body.

The payload distribution monitoring system is supported by the frame. The payload distribution monitoring system includes a plurality of pressure sensors, a non-transitory computer-readable medium, a controller, and an interface device.

The plurality of pressure sensors is respectively arranged with the first front strut, the second front strut, the first rear strut, and the second rear strut to sense a strut pressure therewithin. The plurality of pressure sensors each is configured to generate a strut pressure signal indicative of the strut pressure sensed by the respective one of the plurality of pressure sensors.

The non-transitory computer-readable medium bears a payload distribution monitoring program that includes a graphical user interface. The controller is in operable communication with each of the plurality of pressure sensors to respectively receive the strut pressure signal therefrom. The controller is in operable arrangement with the non-transitory computer-readable medium such that the controller is configured to execute the payload distribution monitoring program contained thereon. The interface device is in operable communication with the controller. The interface device is configured to display the graphical user interface of the payload distribution monitoring program.

The payload distribution monitoring program includes a strut pressure monitoring module and a messaging module. The strut pressure monitoring module is configured to monitor for an unbalanced loading condition within the body based upon a relative strut pressure differential exceeding a differential limit. The strut pressure monitoring module is configured to compute the relative strut pressure differential using the strut pressure signal associated with each of the first front strut, the second front strut, the first rear strut, and the second rear strut. The messaging module is configured to display, through the graphical user interface, an unbalanced loading indicator in the interface device indicating that the unbalanced loading condition occurred once the relative strut pressure differential exceeds the differential limit.

In yet another aspect of the present disclosure, embodiments of a system for monitoring a payload distribution of a machine are described. In one embodiment, a system for monitoring a payload distribution is described for a machine that includes a frame and a suspension system. The suspension system is mounted to the frame and includes a first front strut, a second front strut, a first rear strut, and a second rear strut. The system for monitoring a payload distribution of the machine includes a plurality of pressure sensors, a non-transitory computer-readable medium, a controller, and an interface device.

The plurality of pressure sensors is adapted to be respectively arranged with the first front strut, the second front strut, the first rear strut, and the second rear strut to sense a strut pressure therewithin. The plurality of pressure sensors is each configured to generate a strut pressure signal indicative of the strut pressure sensed by the respective one of the plurality of pressure sensors.

The non-transitory computer-readable medium bears a payload distribution monitoring program that includes a graphical user interface. The controller is in operable communication with each of the plurality of pressure sensors to respectively receive the strut pressure signal therefrom. The controller is in operable arrangement with the non-transitory computer-readable medium such that the controller is configured to execute the payload distribution monitoring program contained thereon. The interface device is in operable communication with the controller. The interface device is configured to display the graphical user interface of the payload distribution monitoring program.

The payload distribution monitoring program includes a strut pressure monitoring module and a messaging module. The strut pressure monitoring module is configured to monitor for an unbalanced loading condition within the machine based upon a relative strut pressure differential exceeding a differential limit. The strut pressure monitoring module is configured to compute the relative strut pressure differential using the strut pressure signal associated with each of the first front strut, the second front strut, the first rear strut, and the second rear strut. The messaging module is configured to display, through the graphical user interface, an unbalanced loading indicator in the interface device indicating that the unbalanced loading condition occurred once the relative strut pressure differential exceeds the differential limit.

In still another aspect of the present disclosure, embodiments of a method of monitoring a payload distribution of a machine are described. In one embodiment, a method of monitoring a payload distribution of a machine is used with a machine that includes a frame and a suspension system. The suspension system is mounted to the frame and includes a first front strut, a second front strut, a first rear strut, and a second rear strut. The method includes sensing a strut pressure within each of the first front strut, the second front strut, the first rear strut, and the second rear strut with a respective one of a plurality of pressure sensors to generate a strut pressure signal indicative of the strut pressure sensed by the respective one of the plurality of pressure sensors. The strut pressure signal of each of the plurality of pressure sensors is transmitted to a controller.

The controller is used to execute a payload distribution monitoring program stored upon a non-transitory computer-readable medium to determine whether an unbalanced loading condition occurred based upon the strut pressure signal associated with each of the first front strut, the second front strut, the first rear strut, and the second rear strut. In response to the payload distribution monitoring program determining the unbalanced loading condition occurred, the controller is used to execute the payload distribution monitoring program to display, through a graphical user interface, an unbalanced loading indicator in an interface device indicating the unbalanced loading condition occurred.

Further and alternative aspects and features of the disclosed principles will be appreciated from the following detailed description and the accompanying drawings. As will be appreciated, the systems and methods for monitoring a payload distribution of a machine and machines incorporating the same which are disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 6 is a diagrammatic illustration of a third technique for calculating a relative strut pressure differential to determine whether an unbalanced loading condition exists within the machine of FIG. 1, the third technique calculating a bias value.

Figure 1:
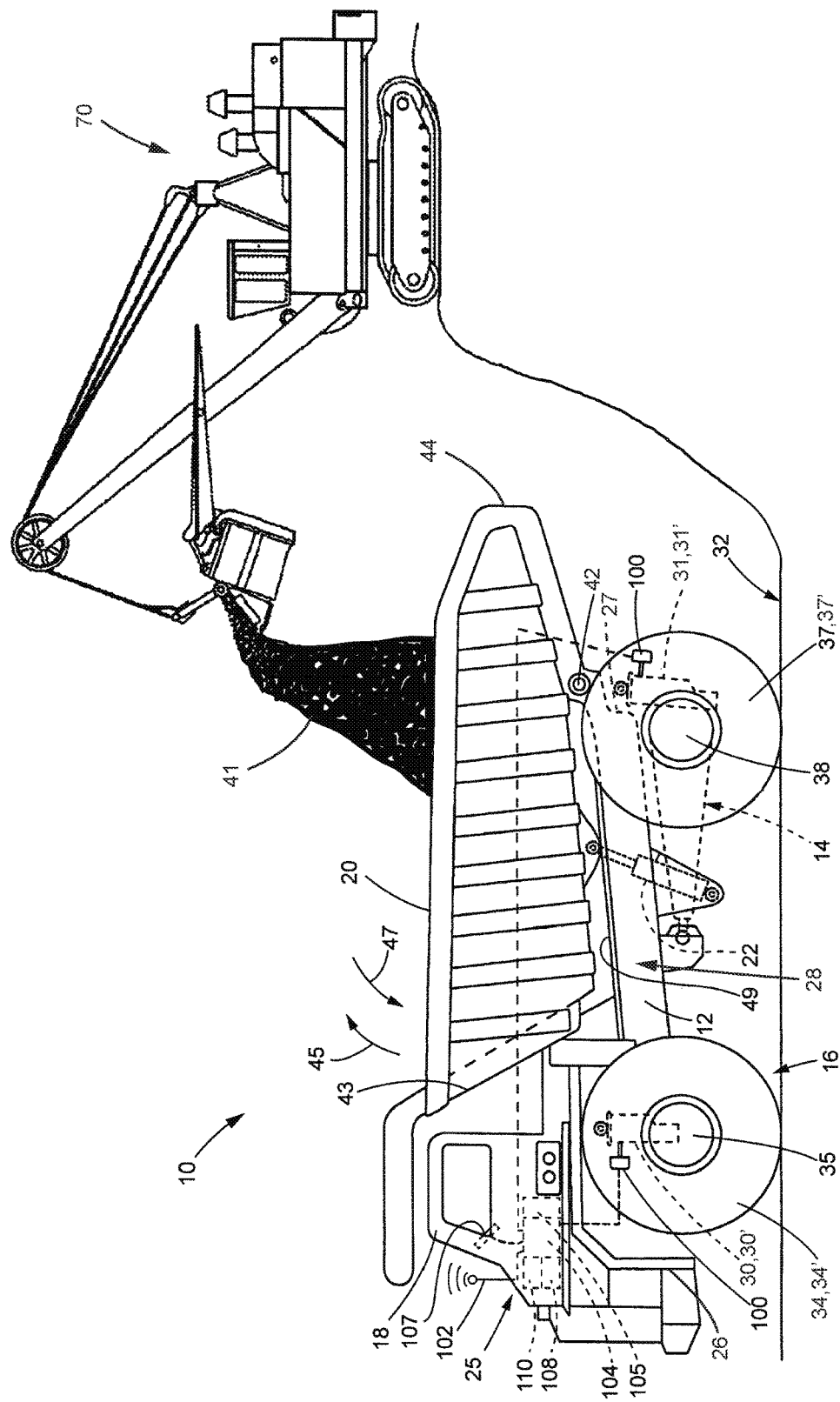
FIG. 1 is a diagrammatic side elevational view of an embodiment of a machine which includes an embodiment of a system for a payload distribution of the machine constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of machines and systems and methods for an unbalanced loading condition within one or more machines at a worksite are disclosed herein. In embodiments, the loading conditions of the machines at a worksite are monitored based upon strut pressure sensor readings taken from the machines as they travel over the worksite.

In embodiments, a machine constructed according to principles of the present disclosure includes a frame, a suspension system mounted to the frame and having a plurality of struts arranged in spaced relationship to each other, and a payload distribution monitoring system supported by the frame. The payload distribution monitoring system includes a plurality of pressure sensors corresponding to the plurality of struts of the suspension system and respectively arranged therewith, a computer-readable medium bearing a payload distribution monitoring program, a controller, and an interface device. The controller is in operable communication with each pressure sensor to receive their signals and is configured to execute the payload distribution monitoring program. The interface device is in operable communication with the controller and configured to display the payload distribution monitoring program's graphical user interface. The payload distribution monitoring program is configured to monitor the strut pressure signals for an unbalanced loading condition within the machine.

In embodiments, the unbalanced loading condition is determined to have occurred when a relative strut pressure differential computed by the payload distribution monitoring program exceeds a differential limit. The strut pressure monitoring module can be configured to compute the relative strut pressure differential using the strut pressure signal associated with each of the first front strut, the second front strut, the first rear strut, and the second rear strut. In embodiments, the relative strut pressure differential can be based upon at least one of a calculation of a rack value (the difference between the sum of the left front strut pressure and the right rear strut pressure and the sum of the right front strut pressure and the left rear strut pressure); a calculation of a pitch value (the difference between the sum of the left front strut pressure and the right front strut pressure and the sum of the left rear strut pressure and the right rear strut pressure); and a calculation of a bias value (the difference between the sum of the left front strut pressure and the left rear strut pressure and the sum of the right front strut pressure and the right rear strut pressure).

In embodiments, the payload distribution monitoring program includes a strut pressure monitoring module and a messaging module. The strut pressure monitoring module is configured to monitor for an unbalanced loading condition within the machine based upon a relative strut pressure differential exceeding a differential limit. The strut pressure monitoring module is configured to compute the relative strut pressure differential using the strut pressure signal associated with each of the first front strut, the second front strut, the first rear strut, and the second rear strut. The messaging module is configured to display, through the graphical user interface, an unbalanced loading indicator in the interface device indicating that the unbalanced loading condition occurred once the relative strut pressure differential exceeds the differential limit.

In embodiments, a method of monitoring loading conditions of a machine following principles of the present disclosure can be used to determine the existence of an unbalanced loading condition at a particular location of a worksite. In embodiments, a plurality of machines each equipped with an embodiment of a payload distribution monitoring system constructed according to principles of the present disclosure can be used to generate a historical set of strut pressure data corresponding to the particular location at the worksite (which can be associated with a particular loader and/or a particular operator of the loader, for example). The payload distribution monitoring program can be used to evaluate trends in the historical set of strut data to determine whether unbalanced loading conditions exist over the set of machines using that location for loading. By monitoring the strut pressures of the machines and flagging a location at the worksite where relative strut pressure changes exceed a threshold amount occur, a worksite manager can identify locations at the worksite that can be remediated to improve the loading of the machines and/or that can be marked for an operator to be further trained in performing his tasks.

Turning now to the Figures, there is shown in FIG. 1 an exemplary embodiment of a machine 10 constructed according to principles of the present disclosure which includes an embodiment of a system for monitoring a payload distribution of a machine. In the illustrated embodiment, the machine 10 is in the form of an off-highway truck and includes a frame 12, a suspension system 14, a ground-engaging system 16, an operator compartment 18, a body in the form of a dump body 20, a hydraulic cylinder 22, and a payload distribution monitoring system 25 constructed according to principles of the present disclosure.

In other embodiments, the principles disclosed herein can be incorporated and used with other suitable machines, such as machines that are used in industries including mining, construction, forestry, farming, etc. Non-limiting examples of other mobile machines that can be constructed according to principles of the present disclosure include commercial machines, such as other trucks, earth moving vehicles, mining vehicles, dozers, wheel loaders, material handling equipment, farming equipment, and other types of movable machines. In other embodiments, the machine 10 can have different forms, such as any other machine having a suspension system with at least two struts.

The frame 12 includes structural members of the machine 10 that can be used to support other systems of the machine. In embodiments, the frame 12 can have any suitable configuration as will be appreciated by one skilled in the art. The frame has a front end 26, a rear end 27 in opposing relationship to the front end 26, a first side 28 or left side, and a second side 29 or right side in opposing relationship to the first side 28 (see also, FIG. 2).

Referring to FIG. 1, the suspension system 14 is mounted to the frame 12. The suspension system 14 can be provided to support the dump body 20 in a manner to provide dampened oscillatory motion between the ground-engaging system 16 and the dump body 20. In embodiments, the suspension system 14 includes at least two struts 30, 31. The front and rear struts 30, 31 can be disposed in supporting relation to the dump body 20 in any suitable manner known to those skilled in the art.

Figure 2:
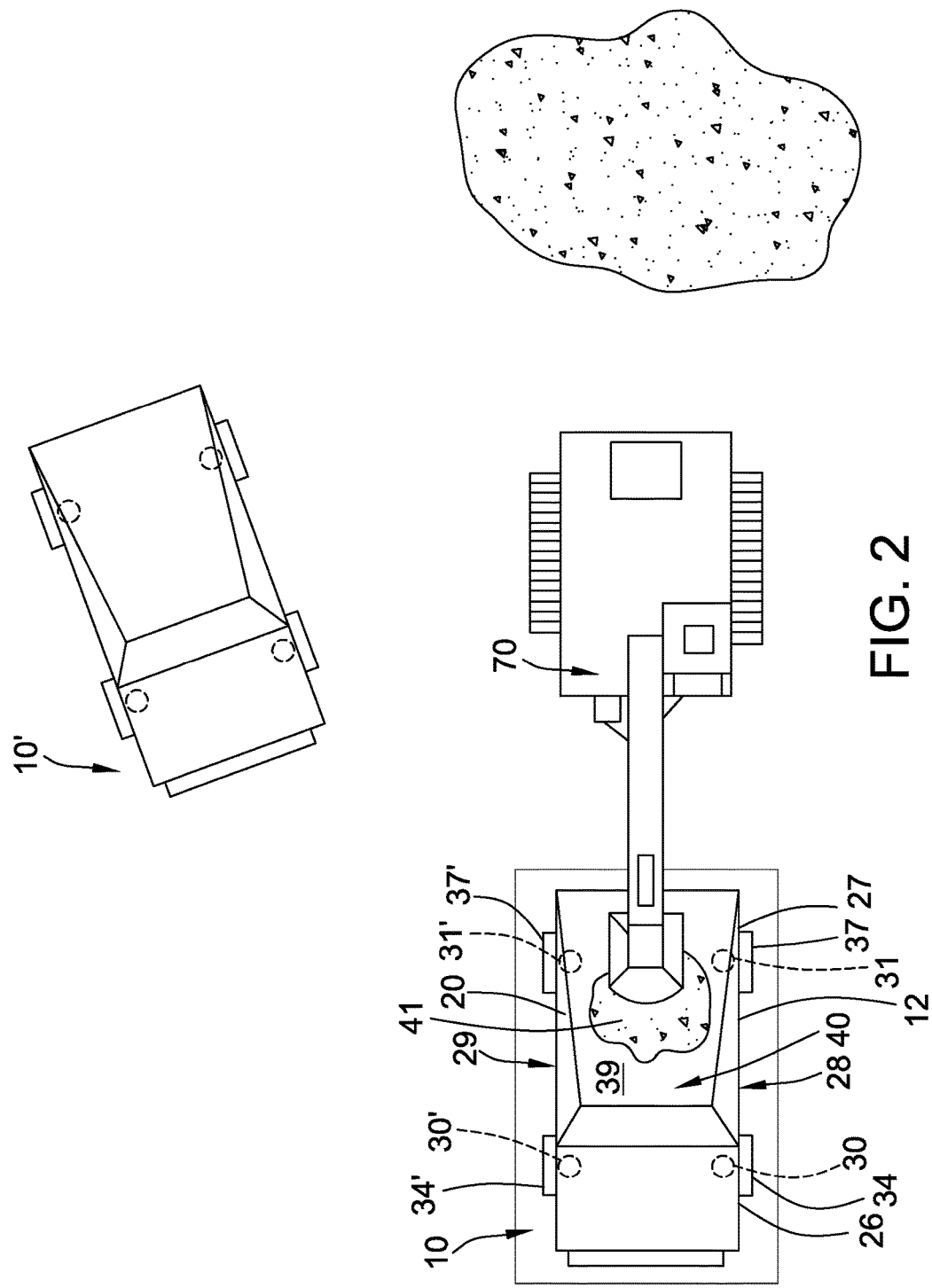
FIG. 2 is a top plan view of a portion of an exemplary worksite, including the machine of FIG. 1 and a second machine being similar in construction to the machine of FIG. 1.

In the illustrated embodiment, the suspension system 14 includes four struts 30, 31, namely a first or left front strut 30, a second or right front strut 30', a first or left rear strut 31, and a second or right rear strut 31' arranged in a suitable manner as will be appreciated by one skilled in the art (see also, FIG. 2).

Referring to FIGS. 1 and 2, in the illustrated embodiment, the first front strut and the second front strut are disposed adjacent the front end of the frame and on the first side and the second side of the frame, respectively. The first rear strut and the second rear strut are disposed adjacent the rear end of the frame and on the first side and the second side of the frame, respectively. In the illustrated embodiment, the first front strut, the second front strut, the first rear strut, and the second rear strut are placed in supporting relationship with the dump body 20 to support the supply of material disposed within the body 20.

In embodiments, the front and rear struts 30, 31 can be any suitable type of strut, such as, a gas-over-liquid type, for example, as will be appreciated by one skilled in the art. The pressure of the fluid within each strut 30, 31 generally corresponds to the magnitude of the load applied to that strut 30, 31.

Referring to FIG. 1, the ground-engaging system 16 can be configured to engage the ground 32, or other surface, to propel the machine 10. In embodiments, the ground-engaging system 16 is mounted to the frame 12 such that the suspension system 14 is interposed between the frame 12 and the ground-engaging system 16.

In embodiments, the ground-engaging system 16 can include one or more suitable ground-engaging elements adapted to engage the ground to propel the machine 10. In embodiments, the ground-engaging system 16 includes a plurality of front wheels 34 rotatably mounted to a front axle 35 and a plurality of rear wheels 37 rotatably mounted to a rear axle 38. The front axle 35 is disposed adjacent the front end 26 of the frame 12, and the rear axle 38 is disposed adjacent the rear end 27 of the frame 12. In embodiments, the ground-engaging system 16 includes at least two front wheels 34 and at least two rear wheels 37. In other embodiments, the number of front wheels 34 and/or rear wheels 37 can vary. For example, in some embodiments, the ground-engaging system 16 can include two front wheels 34 (one on each side of the machine 10) and four rear wheels (two one each side of the machine 10).

In the illustrated embodiment, the ground-engaging system 16 includes a first front wheel 34 and a second front wheel 34', which are respectively disposed on the first side 28 and the second side 29 of the frame 12 and both rotatably mounted to the front axle 35. The ground-engaging system 16 includes a first rear wheel 37 and a second rear wheel 37', which are respectively disposed on the first side 28 and the second side 29 of the frame 29 and both rotatably mounted to the rear axle 37.

In embodiments, the suspension system 14 includes at least one front strut 30 interposed between the frame 12 and the plurality of front wheels 34 and at least one rear strut 31 interposed between the frame 12 and the plurality of rear wheels 37. In the illustrated embodiment, the suspension system 14 includes a pair of front struts 30, 30' associated with the front wheels 34, 34' (one on each side 28, 29 of the machine 10) and a pair of rear struts 31, 31' associated with the rear wheels 37, 37' (one on each side 28, 29 of the machine 10). The first front strut 30 and the second front strut 30, are interposed between the frame 12 and the first front wheel 34 and the second front wheel 34', respectively, and the first rear strut 31 and the second rear strut 31' are interposed between the frame 12 and the first rear wheel 37 and the second rear wheel 37', respectively.

The illustrated machine 10 is adapted to be controlled by an operator. The operator compartment 18 is supported by the frame 12 and is configured to hold one or more operators therein during operation of the machine 10.

Referring to FIGS. 1 and 2, the body is in the form of a dump body 20 which is mounted to the frame 12. The dump body 20 includes a payload support surface 39 defining a payload storage area 40 configured to hold a supply of material 41 therein.

Referring to FIG. 1, the dump body 20 is pivotally connected to the frame 12 by a pivot pin 42 such that the dump body 20 is pivotally movable over a range of travel between a hauling position, as shown in FIG. 1, and one of several dumping positions in which a front end 43 of the dump body 20 is in an elevated position in relation to a rear end 44 thereof. The hydraulic cylinder 22 is connected to the frame 12 and the dump body 20 such that the hydraulic cylinder 22 can be selectively extended to pivot the dump body 20 about the pivot pin 42 from the hauling position in a dumping direction 45 to one of several dumping positions and retracted to return the dump body 20 from the dumping position in a lowering direction 47 to the hauling position. The contents of the dump body 20 can be dispensed therefrom by controllably pressurizing the hydraulic cylinder 22 to pivotally move the dump body 20 about the pivot pin 42 from the hauling position shown in FIG. 1 to a selected dumping position.

In other embodiments, the body can take different forms. For example, in other embodiments, the body can have a During normal operation in the hauling (or loading) mode, the hydraulic cylinder 22 does not support the weight of the dump body 20. In the hauling position (which is used during a typical loading cycle), there is negligible pressure within the hydraulic cylinder 22, and the weight of the dump body 20 is transferred to the frame 12 through the pivot pin 42 and a pair of payload support rails 49 attached to the frame 12 (one on each side of the machine 10).

Referring to FIG. 1, the machine 10 includes an embodiment of a payload distribution monitoring system 25 constructed according to principles of the present disclosure. The payload distribution monitoring system 25 is configured to monitor loading conditions of the machine 10 by evaluating the pressure within the struts 30, 30', 31, 31' of the machine 10 to detect when the supply of material 41 stored within the payload storage area 40 of the machine 10 is in an unbalanced condition. In embodiments, the payload distribution monitoring system 25 is configured to detect when the unbalanced condition occurs when a relative strut pressure differential in the struts 30, 30', 31, 31' exceeds a differential limit. In embodiments, the relative strut pressure differential is computed according to a predetermined technique. In embodiments, the payload distribution monitoring system 25 is configured to compare a set of pressure sensor readings from a plurality of machines 10, 10' travelling over the worksite to determine whether a particular loading machine 70 is being operated in a manner in which a spotting error is occurring.

The payload distribution monitoring system 25 is supported by the frame 12. The illustrated payload distribution monitoring system 25 includes a plurality of pressure sensors 100, a geolocation unit 102, a controller 104, a non-transitory computer-readable medium 105, an interface device 107, a data storage device 108, and a communication device 110.

One of the pressure sensors 100 is respectively positioned within each of the struts 30, 30', 31, 31'. Each pressure sensor 100 is operable to sense the pressure within the strut 30, 30', 31, 31' with which it is associated. It should be appreciated that the pressure of the fluid within each of the struts 30, 30', 31, 31' is related to a weight which is supported by the respective strut 30, 30', 31, 31', including a payload weight of the supply of material 41 disposed within the dump body 20. Further, the pressure within the struts 30, 30', 31, 31' is normally subjected to oscillations while the machine 10 is experiencing changes in loading conditions. The pressure oscillations can vary in frequency, magnitude, and/or range in response to the particular loading conditions which the machine 10 is experiencing.

Figure 3:
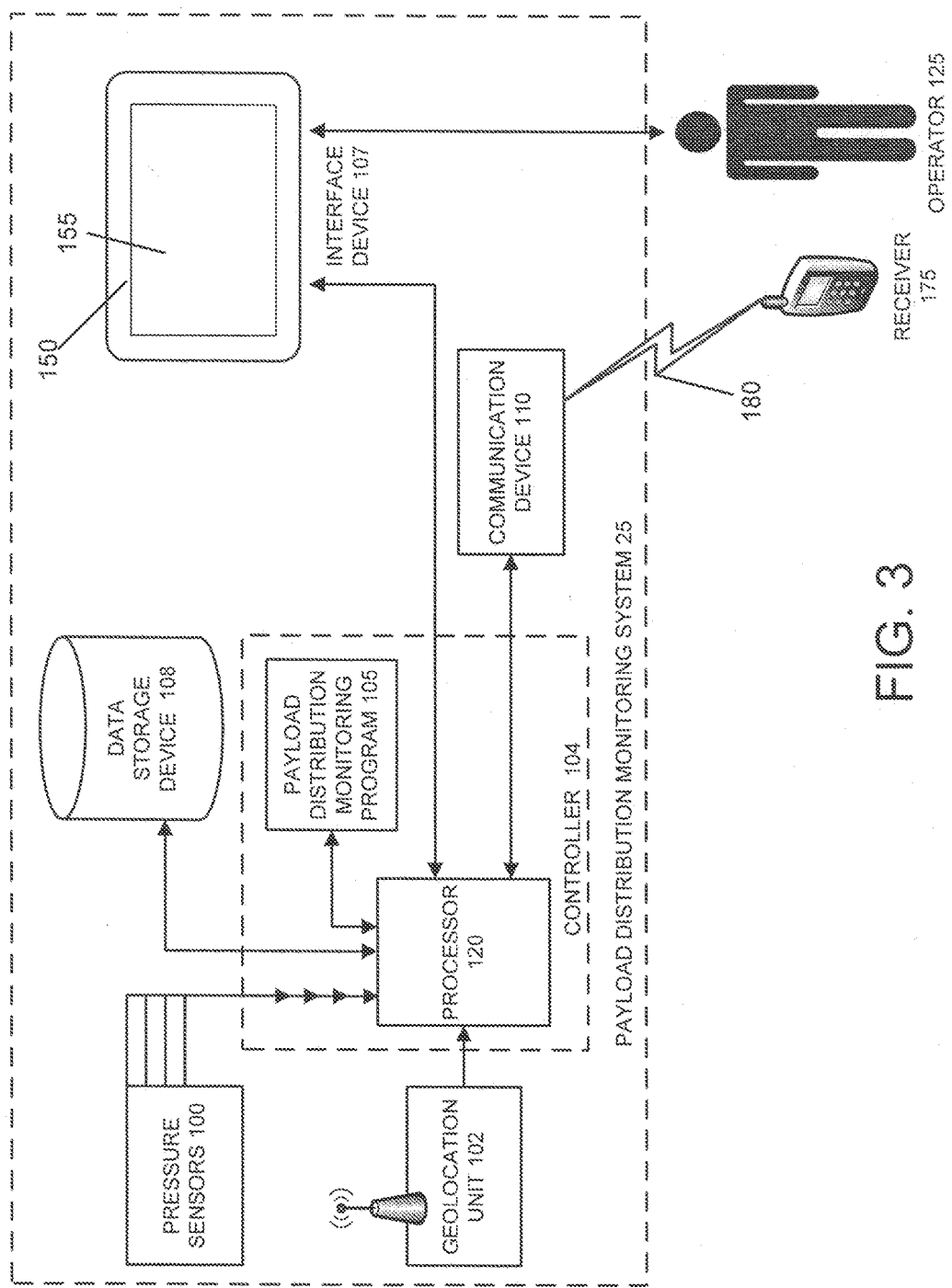
FIG. 3 is a schematic and diagrammatic view of an embodiment of a system for monitoring a payload distribution of a machine constructed in accordance with principles of the present disclosure.

Referring to FIG. 3, there is shown a schematic and diagrammatic view of the payload distribution monitoring system 25 of the machine 10. The pressure sensors 100 are respectively arranged with the first front strut 30, the second front strut 30', the first rear strut 31, and the second rear strut 31' to sense a strut pressure within each one of the struts 30, 30', 31, 31'. Each of the pressure sensors 100 is configured to generate a respective strut pressure signal indicative of the strut pressure sensed by the particular pressure sensor 100. In embodiments, the pressure sensors 100 can comprise any suitable pressure sensor configured to sense a pressure within the associated strut 30, 30', 31, 31' and operable over a pressure range which matches the intended application of the machine 10. In embodiments, the pressure sensors 100 are configured to transmit a strut pressure signal substantially continuously to the controller 104.

The geolocation unit 102 is configured to generate a location signal indicative of a location of the machine 10. In embodiments, the geolocation unit 102 can comprise any suitable device configured to determine the location of the machine 10 and to send a location signal indicative of an absolute location (including, e.g., latitude, longitude, and altitude information) of the machine 10 to the controller 104. For example, in embodiments, the geolocation unit comprises a Global Positioning System (GPS) receiver. In embodiments, the GPS receiver 102 is configured to generate a location signal that includes a latitudinal position and a longitudinal position.

In other embodiments, the geolocation unit 102 can comprise a portion of an Inertial Reference System (IRS), a local tracking system, or another known locating system that receives or determines positional information associated with the machine 10. Suitable technologies for geolocation include, but are not limited to, the U.S. Global Positioning System, the Russian GLONASS satellite-based system, the European Galileo satellite-based system, and radio-positioning systems provided by Locata Corporation of Canberra, Australia, for example. In embodiments, the geolocation unit 102 can be configured to receive and process geolocation signals from multiple systems to generate the location signal sent to the controller 104. In some embodiments, the location signal generated by the geolocation unit 102 can be conveyed to a remotely-located central station via the communication device 110 to convey signals indicative of the received or determined positional information of the machine 10 for further processing.

The controller 104 is in operable communication with the pressure sensors 100 to receive the respective strut pressure signals therefrom and with the geolocation unit 102 to receive the location signal therefrom. The controller 104 is in operable arrangement with the non-transitory computer-readable medium 105 such that the controller 104 is configured to execute the payload distribution monitoring program contained thereon. The controller 104 is also operably arranged with the interface device 107, the data storage device 108, and the communication device 110.

The controller 104 can include a processor 120 and be programmed with the payload distribution monitoring program contained upon the non-transitory, tangible computer-readable storage medium 105. When executed by the processor 120, the payload distribution monitoring program 105 provides the controller 104 with the functionality to monitor the strut pressure of the machine 10 (based upon the readings from the pressure sensors 100) to determine whether the machine 10 has experienced an unbalanced loading condition that constitutes a hazard. In embodiments, the unbalanced loading hazard event can be considered to be any unbalanced loading condition that could potentially damage the machine and/or contribute to the reduction in the service life of one or more components of the machine. In other embodiments, the unbalanced loading hazard event can constitute an unbalanced loading condition at which safety and/or payload considerations indicate that one or more operating conditions of the machine should change in order to promote the safety of the machine 10 and its operator(s) 125 and/or the efficient transportation of the supply of material 41 within the dump body 20 of the machine 10. In embodiments, the payload distribution monitoring program 105 provides the controller 104 with the functionality to track the location of each unbalanced loading hazard event it detects at the worksite.

In embodiments, the processor 120 can generally include any component of an application that can receive input from a client or the interface device 107, process the input, present the input to the payload distribution monitoring program 105, and present output from the processor 120 to a client (such as a remotely-located central processing unit), the interface device 107, and/or to the data storage device 108, and execute logic for the payload distribution monitoring program 105. In embodiments, the controller 104 can include one or more processors that can execute instructions and process data to perform one or more functions associated with the payload distribution monitoring system 25. For instance, the controller 104 can execute software that enables the payload distribution monitoring system 25 to request and/or receive data from outside of the payload distribution monitoring system 25, such as operational data pertaining to the machine 10 from one or more other systems and/or fleet unbalanced loading hazard event data from another machine and/or a central computer system in communication with a number of machines that each include a payload distribution monitoring system constructed according to principles of the present disclosure. The controller 104 can also execute software that enables the payload distribution monitoring system 25 to determine the location of each hazard event previously determined to have occurred within a predetermined period of time (by any such machine generating hazard event data) at a worksite at which the machine 10 is located.

In embodiments, the controller 104 is configured to communicate to another processing unit, such as a central computer system with which a fleet of machines having a payload distribution monitoring system constructed according to principles of the present disclosure is in communication.

In embodiments, the controller 104 is configured to transmit an unbalanced loading event signal to the off board processing unit. In embodiments, the hazard event signal can include data generated by the payload distribution monitoring system 25, including, e.g., strut pressure data and corresponding location data. In embodiments, the unbalanced loading event signal contains strut pressure data and corresponding location data. In embodiments, the unbalanced loading event signal contains unbalanced loading event data indicating the unbalanced loading condition occurred and a time and place of occurrence for the unbalanced loading condition.

The non-transitory computer-readable medium 105 bears a payload distribution monitoring program constructed according to principles of the present disclosure. The payload distribution monitoring program 105 includes a graphical user interface. In embodiments, the payload distribution monitoring program 105 is configured to monitor the strut pressure signals from the pressure sensors 100 to determine whether the machine 10 experiences an unbalanced loading condition. For example, in embodiments, the payload distribution monitoring program 105 is configured to monitor the strut pressure signals from the pressure sensors 100 to determine whether the supply of material 41 deposited in the dump body 20 of the machine 10 by the loading machine 70 is placed in an unbalanced condition during a loading sequences, such as is shown in FIGS. 1 and 2. In embodiments, the payload distribution monitoring program 105 is configured to track the locations at the worksite where such unbalanced loading conditions occur. In embodiments, the payload distribution monitoring program 105 is configured to carry out any method (or steps of a method) of monitoring a payload distribution of a machine 10 that follows principles of the present disclosure. In embodiments, the payload distribution monitoring program 105 can include a strut pressure monitoring module, a tracking module, a messaging module, and a mapping module.

The strut pressure monitoring module can be configured to monitor the strut pressure signals from each of the pressure sensors 100 for an occurrence of an unbalanced loading condition. In embodiments, the strut pressure monitoring module is configured to monitor for an unbalanced loading condition within the dump body 20 of the machine 10 based upon a relative strut pressure differential exceeding a differential limit. In embodiments, the strut pressure monitoring module is configured to compute the relative strut pressure differential using the strut pressure signal associated with each of the first front strut 30, the second front strut 30', the first rear strut 31, and the second rear strut 31'. In embodiments, the strut pressure monitoring module is configured to compute a severity value for the unbalanced loading condition which translates the computed relative strut pressure differential to a finite scale (e.g., on a scale from 1 to 10).

In embodiments, the strut pressure monitoring module can be configured to monitor the strut pressure signals from each of the pressure sensors 100 substantially continuously for an occurrence of an unbalanced loading condition. In embodiments, the strut pressure monitoring module can be configured to monitor the strut pressure signals from each of the pressure sensors 100 only when the machine 10 is stationary, such as when it is engaged in a loading cycle. In some embodiments, the strut pressure monitoring module can use the location signal from the geolocation unit 102 to determine whether the machine is stationary. In still other embodiments, a velocity of the machine 10 from an onboard module of the machine can be in communication with the controller 104, and its velocity reading can be used by the strut pressure monitoring module to determine whether the machine is moving 10.

In embodiments, the strut pressure monitoring module can be configured to monitor the strut pressure signals from each of the pressure sensors 100 to determine when the machine is undergoing a loading cycle in which the weight of the supply of material 41 within the dump body is changing. In embodiments, the strut pressure monitoring module can be configured to provide real time loading condition data to the operator via the interface device 107 during the loading cycle. In embodiments, the strut pressure monitoring module can be configured to ignore unbalanced loading conditions that occur during the loading cycle In embodiments, the strut pressure monitoring module of the payload distribution monitoring program is configured to compute the relative strut pressure differential by at least determining a difference between a first sum of the strut pressure of two of the first front strut 30, the second front strut 30', the first rear strut 31, and the second rear strut 31' and a second sum of the strut pressure of the other two of the first front strut 30, the second front strut 30', the first rear strut 31, and the second rear strut 31'. In embodiments, the difference between the first sum and the second sum can be converted into an absolute value. In embodiments, the calculated difference can be used as a part of another formula or formulae for calculating the relative strut pressure differential.

Figure 4:
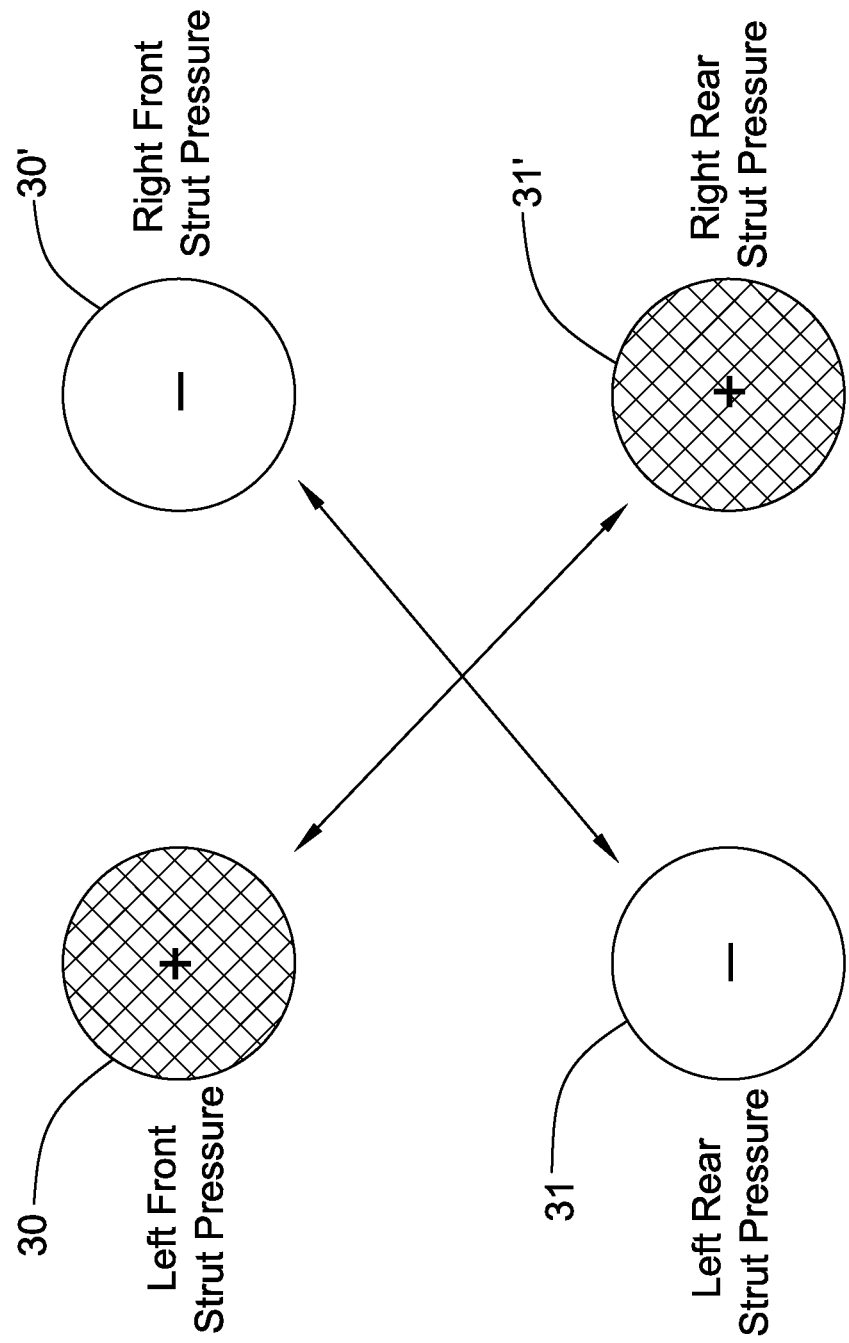
FIG. 4 is a diagrammatic illustration of a first technique for calculating a relative strut pressure differential to determine whether an unbalanced loading condition exists within the machine of FIG. 1, the first technique calculating a rack value.

For example, referring to FIG. 4, in embodiments, the strut pressure monitoring module of the payload distribution monitoring program is configured to compute the relative strut pressure differential by at least calculating a rack value for the loading condition of the machine 10 based upon a comparison of the struts pressures of diagonally opposed pairs of struts 30, 30', 31, 31'. In embodiments, the calculated rack value can be used as a part of another formula or formulae for calculating the relative strut pressure differential.

The rack value of the machine 10 can correspond to the tendency of the frame 12 to twist when subjected to an unbalanced loading condition. Racking can cause high loads to be applied to components such as the frame 12, which may lead to the cracking of the frame 12. Racking occurs, for example, when the machine 10 backs under a shovel and one of the rear wheels 37, 37' backs up on the toe. It can also occur when one of the wheels 34, 34', 37, 37' of the machine 10 strikes an object on the haul road, such as a pothole.

In the illustrated embodiment of FIG. 4, the rack value of the machine 10 is computed by taking the difference of the first sum comprising the strut pressure of the first front strut 30 and the second rear strut 31' and the second sum comprising the strut pressure of the second front strut 30' and the first rear strut 31. The strut pressure monitoring module of the payload distribution monitoring program can be configured to compute illustrated rack value using the following equation:

$$\text{Rack Value} = (LF + RR) - (RF + LR) \qquad \text{(Eq. 1)},$$

where LF is the strut pressure of the first or left front strut 30,

RR is the strut pressure of the second or right rear strut 31',

RF is the strut pressure of the second or right front strut 30', and

LR is the strut pressure of the first or left rear strut 31.

Figure 5:
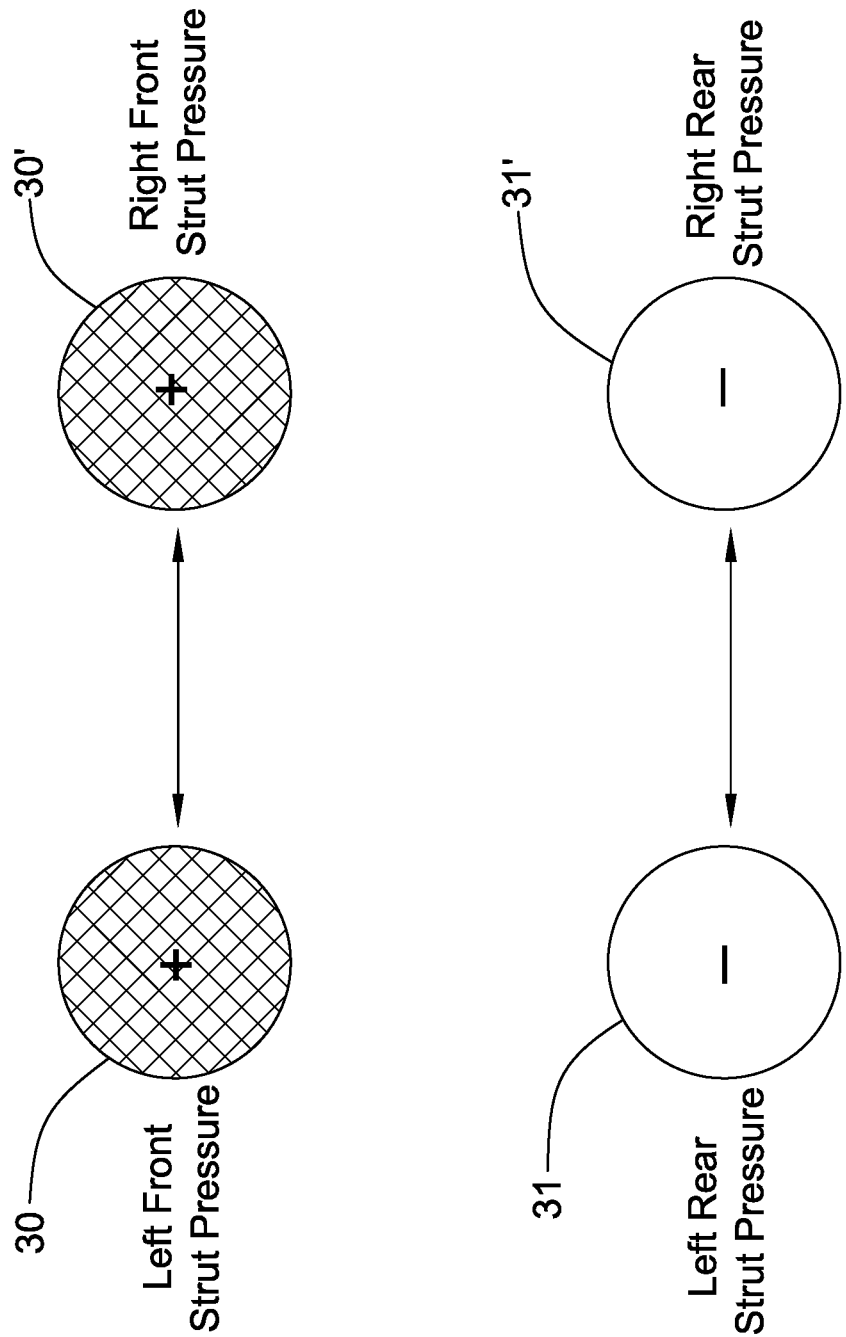
FIG. 5 is a diagrammatic illustration of a second technique for calculating a relative strut pressure differential to determine whether an unbalanced loading condition exists within the machine of FIG. 1, the second technique calculating a pitch value.

Referring to FIG. 5, in embodiments, the strut pressure monitoring module of the payload distribution monitoring program is configured to compute the relative strut pressure differential by at least calculating a pitch value for the loading condition of the machine 10 based upon a comparison of the strut pressures of the front struts 30, 30' and the rear struts 31, 31'. In embodiments, the calculated pitch value can be used as a part of another formula or formulae for calculating the relative strut pressure differential.

The pitch value of the machine 10 can correspond to the front end 43 to rear end 44 location of the center of gravity of the supply of material 41 in the dump body 20. A load having a significant pitch value can cause concentrated loads to be applied to the front wheels 34, 34' or the rear wheels 37,37' depending upon the direction of pitch. Pitching can occur when the machine 10 is situated on a graded surface, for example. It can also occur when the machine 10 crosses a ditch or other obstacle (such as, a pipe, for example) that extends transversely across the haul road.

In the illustrated embodiment of FIG. 5, the pitch value of the machine 10 is computed by taking the difference of the first sum, which comprises the strut pressure of the first front strut 30 and the second front strut 30', and the second sum, which comprises the strut pressure of the first rear strut 31 and the second rear strut 31'. The strut pressure monitoring module of the payload distribution monitoring program can be configured to compute the illustrated pitch value using the following equation:

$$\text{Pitch Value} = (LF + RF) - (LR + RR) \quad \text{(Eq. 2)},$$

where LF, RF, LR, and RR have the same meaning as they do in Equation (1).

Referring to FIG. 6, in embodiments, the strut pressure monitoring module of the payload distribution monitoring program is configured to compute the relative strut pressure differential by at least calculating a bias value for the loading condition of the machine 10 based upon a comparison of the strut pressures of the first front strut 30 and the first rear strut 31 to the second front strut 30' and the second rear strut 31'. In embodiments, the calculated bias value can be used as a part of another formula or formulae for calculating the relative strut pressure differential.

The bias value of the machine 10 can correspond to the side 28 to side 29 location of the center of gravity of the supply of material 41 in the dump body 20. A load having a significant bias value can cause concentrated loads to be applied to the front and rear wheels of the first side 29 or the second side 29 of the machine 10 depending upon the direction of bias. Biasing can occur when the loading machine 70 does not center the supply of material 41 within the payload storage area 40 of the dump body 20. It can also occur when the machine 10 travels around a corner of the haul road which has insufficient or negative road camber, causing the supply of material 41 within the dump body 20 to shift laterally toward the outside wheels.

In the illustrated embodiment of FIG. 6, the bias value of the machine 10 is computed by taking the difference of the first sum, which comprises the strut pressure of the first front strut 30 and the first rear strut 31, and the second sum, which comprises the strut pressure of the second front strut 30' and the second rear strut 31'. The strut pressure monitoring module of the payload distribution monitoring program can be configured to compute the illustrated bias value using the following equation:

$$\text{Bias Value} = (LF + LR) - (RF + RR) \quad \text{(Eq. 3)},$$

where LF, LR, RF, and RR have the same meaning as they do in Equation (1).

In embodiments, the strut pressure monitoring module of the payload distribution monitoring program can be configured to compute the relative strut pressure differential by at least using an absolute value of any one of the rack value, the pitch value, and the bias value calculated according to Equations 1-3, respectively. In embodiments, the strut pressure monitoring module of the payload distribution monitoring program can be configured to compute the relative strut pressure differential by at least calculating a composite loading condition value using at least two of the rack value, the pitch value, and the bias value calculated according to Equations 1-3, respectively. In embodiments, the calculated composite loading condition value can be used as a part of another formula or formulae for calculating the relative strut pressure differential. In embodiments, the strut pressure monitoring module of the payload distribution monitoring program can be configured to transmit via the controller 104 load calculation data to the data storage device 108 that it generates to compute the relative strut pressure differential using the strut pressure signal associated with each of the first front strut 30, the second front strut 30', the first rear strut 31, and the second rear strut 31'.

In embodiments, the strut pressure monitoring module of the payload distribution monitoring program 105 is configured to determine whether an unbalanced loading condition hazard event has occurred based upon comparing the strut pressure signals from the pressure sensors 100 to a database of strut pressure data stored in the data storage device 108. In embodiments, a suitable statistical analysis technique applied to the database of strut pressure data can be used to monitor the strut pressure signals of the machine to determine whether an unbalanced loading condition has occurred.

In embodiments, the strut pressure monitoring module is configured to compare the relative strut pressure differential in the strut pressures sensed by the pressure sensors 100 at a present time to the historical set of relative strut pressure differentials occurring at the location in the past to determine whether an unbalanced loading condition is occurring. In embodiments, the historical set of relative strut pressure differentials can be stored in the form of a database in the data storage device 108. In embodiments, the database of historical relative strut pressure differentials for a given location at the worksite can be populated from a plurality of machines equipped with a payload distribution monitoring system 25 constructed according to principles of the present disclosure that are situated at the same location. In some embodiments, the historical set of dynamic strut pressure changes for a given location at the worksite can be limited to a particular period of time. In some embodiments, the relative strut pressure differentials for a particular location that were made prior to a certain time (e.g., prior to a current operator manning the loading machine 70 at the location or prior to the loading machine 70 being positioned at the location, for example) can be eliminated from the historical set of relative strut pressure differentials and/or excluded from consideration by the strut pressure monitoring module.

In embodiments, the strut pressure monitoring module is configured to compute a center of gravity for the supply of material 41 stored within the dump body 20 using the strut pressure signal associated with each of the first front strut 30, the second front strut 30', the first rear strut 31, and the second rear strut 31'. In embodiments, the first front strut 30, the second front strut 30', the first rear strut 31, and the second rear strut 31' can be located a known distance from each other. The strut pressure signals from the pressure sensors 100 can be used by the pressure monitoring module to compute a center of gravity for the supply of material 41 stored within the dump body 20 using strut pressures sensed by the pressure sensors 100 and the known distances between the struts 30, 30', 31, 31'.

The tracking module can be configured to track the location of the machine 10 when the unbalanced loading condition occurred. In embodiments, the tracking module can use the data in the location signal from the geolocation unit 102 to determine the location at which the unbalanced loading condition occurred. In embodiments, the tracking module can also store the time at which the machine 10 experienced the unbalanced loading condition.

In embodiments, the tracking module can be configured to store the location and/or time data relating to the unbalanced loading conditions experienced by the machine 10 in the data storage device 108. In embodiments, the tracking module is configured to track the location of the machine 10 while the machine 10 is moving using the location signal from the geolocation unit 102 and to compare the location of the machine 10 with a set of payload hazard locations stored in the data storage device 108 to determine when the machine 10 is within a predetermined payload hazard distance from at least one of the set of payload hazard locations. In embodiments, the geolocation unit 102 can be configured to include heading data in the location signal indicating the direction in which the machine 10 is travelling to help the tracking module determine whether the machine 10 is moving closer to or farther from a payload hazard location.

In embodiments, the controller 104 is adapted to assemble an unbalanced loading indicator (such as in the form of a first pop-up message) from data in the data storage device 108 in response to receiving an indication from the strut pressure monitoring module of the payload distribution monitoring program 105 that the machine 10 has experienced an unbalanced loading condition. In embodiments, the messaging module can be configured to display, through the graphical user interface, an unbalanced loading indicator in the interface device 107 indicating that the unbalanced loading condition occurred once the relative strut pressure differential exceeds the differential limit. The controller 104 can transmit the unbalanced loading indicator to the interface device 107 for display to the operator 125 via the graphical user interface of the payload distribution monitoring program 105.

The unbalanced loading indicator can include data describing the unbalanced loading condition, including for example the nature of the unbalanced loading condition. In embodiments, the data describing the unbalanced loading condition can include, for example, the location of the computed center of gravity of the supply of material 41 within the dump body 20, the directional nature of the unbalanced condition (e.g., a rack value, a pitch value, and/or a bias value that exceeds a predetermined threshold), and/or a severity value for the unbalanced loading condition which translates the computed relative strut pressure differential to a finite scale (e.g., on a scale from 1 to 10). In other embodiments, the unbalanced loading indicator can take the form of an audible sound emitted by a speaker associated with the interface device 107.

In embodiments, the controller 104 is adapted to assemble a warning indicator from data in the data storage device 108 in response to receiving an indication from the tracking module of the payload distribution monitoring program 105 that machine 10 is within a predetermined payload hazard distance from at least one of a set of payload hazard locations corresponding to a set of unbalanced loading condition events. In embodiments, the messaging module can be triggered to compile a suitable warning indicator when the machine 10 is within a predetermined payload hazard distance from at least one of the set of payload hazard locations. The messaging module can be configured to display, through the graphical user interface, a payload hazard-approaching indicator in the interface device 107 indicating that the machine 10 is approaching a hazardous area when the tracking module determines the machine 10 is within the predetermined payload hazard distance. In embodiments, the warning indicator includes at least one of a visible image (such as a second pop-up message displayed by the graphical user interface in the interface device 107) and an audible sound.

The mapping module can be configured to generate a payload hazard map of the worksite using the database of loading condition data in the data storage device. In embodiments, the payload hazard map includes a payload hazard indicator at each of the set of payload hazard locations for the set of unbalanced loading condition events. In embodiments, the mapping module can be configured to display, through the graphical user interface, the payload hazard map in the interface device 107. In embodiments, the mapping module can be configured such that the hazard indicator at the location of each of the set of payload hazard locations is configured to indicate at least one of a number and a number range of unbalanced loading condition events that occurred at the location within a predefined period of time.

In embodiments, an on-board module can be configured to be in communication with the controller 104 such that the on-board module transmits information to the controller 104 concerning the operation of the machine 10 such that the controller 104 can use the operation information to help identify whether an unbalanced loading condition occurred. The on-board module can be interconnected with a variety of other modules and/or sensors as will be appreciated by one skilled in the art. For example, an on-board module can include an Engine Control Module (ECM), a power system control module, an attachment interface that connects one or more sub-components, and any other type of device that the machine 10 can use to facilitate and/or monitor operations of the machine 10 during run time or non-run time conditions (i.e., the engine of the machine 10 running or not running, respectively and/or the machine 10 moving or stationary). In such embodiments, the controller 104 can be adapted to respond to signals received from the sensors either directly or indirectly through the on-board module.

The interface device 107 is in operable communication with the controller 104. The interface device 107 is configured to display the graphical user interface of the payload distribution monitoring program 105. In embodiments, the interface device 107 can be mounted within the operator compartment 18 of the machine 10.

The operator 125 can use the interface device 107 to receive information from the payload distribution monitoring program 105 and to provide inputs to the controller 104 through the interface device 107. The interface device 107 can be configured to provide the operator 125 with an operable interface to other systems of the machine 10.

The interface device 107 is coupled to the controller 104 to receive loading condition data therefrom. In embodiments, an audio device can be associated with the interface device 107 to provide audibly-perceptible information through a speaker. In embodiments, the payload distribution monitoring program 105 can be configured such that the interface device 107 can display a payload hazard map generated by the mapping module of the payload distribution monitoring program 105 and any suitable message compiled by the messaging module regarding the occurrence of an unbalanced loading condition of the machine 10 and/or the approach of a payload hazard location. In the illustrated embodiment, the interface device 107 is adapted to provide information in the form of visibly-displayed indicia.

The interface device 107 can include hardware and/or software components configured to allow the operator 125 to access information stored in the data storage device 108. For example, the graphical user interface of the payload distribution monitoring program 105 can include a data access interface configured to allow the operator 125 to access, configure, store, and/or download information to an off-board system or a receiver 175, such as a computer, a personal digital assistant (PDA) or smart phone using a particularly-configured mobile application ("app"), a diagnostic tool, or any other type of data device. Moreover, the interface device 107 can be configured to allow the operator 125 to access and/or modify information, such as operational parameters, operating ranges, unbalanced loading condition event information for a variety of locations, and/or threshold levels associated with one or more unbalanced loading condition configurations, stored in the data storage device 108.

In the illustrated embodiment, the interface device 107 is mounted within the operator compartment 18 (see FIG. 1). In other embodiments, the interface device 107 can be located elsewhere, including a location remote from the machine 10.

Referring to FIG. 3, the illustrated embodiment of the interface device 107 comprises a liquid crystal display device 150. In embodiments, the liquid crystal display device 150 can be mounted within a panel configuration in the operator compartment 18 or as a stand-alone device.

In embodiments, the interface device 107 can comprise another type of display, a console, a keyboard, push buttons, voice recognition devices, a laptop computer, speakers, and/or other interfaces, as will be appreciated by one skilled in the art. In embodiments, the interface device 107 can include any type of display device that presents information.

The illustrated liquid crystal display device 150 includes a display screen in the form of a touch screen 155 adapted to display information to the operator 125 of the machine 10 and to receive instructions from the operator 125 for transmission to the controller 104 via finger touch input. The touch screen 155 can include a message display section adapted to selectively display a plurality of pop-up messages, such as those generated by the controller 104 using the payload distribution monitoring program 105. In other embodiments, the interface device 107 can include a different type of display screen.

The touch screen 155 can be any suitable size, such as a seven-inch screen, for example, with any suitable aspect ratio, such as 1.66:1 or industry reference "Super 16," for example. The touch screen 155 can be selectively activated using capacitive-touch technology as is well known to those skilled in the art. The touch screen 155 can be configured to detect anything which is conductive or has a dielectric different from that of air. In embodiments, the touch screen 155 can be activated based on a human finger touch applying a predetermined amount of force to the touch screen 155. In embodiments, the touch screen 155 can be configured to respond to immediate touch activation, push and hold activation, and activation upon lift off In embodiments, the brightness and/or color of the background of the display screen 155 can be adjusted. For example, in some embodiments, the display screen 155 can be toggled between a day mode and a night mode, for example. The day mode can have a color scheme and/or brightness that are different from the night mode.

The data storage device 108 is in operable communication with the controller 104. The data storage device 108 can generally include any type of system for storing data in non-volatile storage. This includes, but is not limited to, systems based upon: magnetic, optical, and magneto-optical storage devices, as well as storage devices based on flash memory and/or battery-backed up memory. The data storage device 108 can include a removable memory module, or a fixed memory module, or a combination of removable and fixed memory modules.

In embodiments, the data storage device 108 can include an on-board memory device and/or a remotely-located off-board memory device that can be placed in communication with the controller 104 via the communication device 110. In embodiments, the data storage device 108 includes an off-board memory device that is in communication with a central processing unit that is in communication with a number of machines 10, 10' having a payload distribution monitoring system 25 constructed according to principles of the present disclosure that includes at least two struts 30, 31 each with a corresponding pressure sensor 100 (see also, FIG. 2).

The data storage device 108 can include one or more memory devices that store, organize, sort, filter, and/or arrange data used by the payload distribution monitoring program 105. For example, in embodiments, the data storage device 108 includes a database of loading condition data for a worksite. In embodiments, the loading condition data can include any information generated by the payload distribution monitoring program 105.

In embodiments, the loading condition data includes a set of unbalanced loading condition events and a set of payload hazard locations corresponding to the set of unbalanced loading condition events that the payload distribution monitoring system 25 has generated. In embodiments, the hazard event data includes the strut pressure signal data from each sensor, the location signal data from the geolocation unit 102, and time coded information to correlate the strut pressure signal data and the location signal data to a particular point in time.

In embodiments, the data storage device 108 includes a database of hazard event data that includes a historical set of strut pressure data corresponding to a plurality of locations at a worksite. In embodiments, the strut pressure monitoring module of the payload distribution monitoring program 105 can compare strut pressure signals from the struts 30, 30', 31, 31' of the machine to the historical set of strut pressure data that have occurred at that location the differential limit used by the strut pressure monitoring module to determine whether the unbalanced loading condition has occurred. In embodiments, the differential limit used by the strut pressure monitoring module to determine whether the unbalanced loading condition has occurred is based upon the historical set of strut pressure data occurring at the location. In embodiments, the historical set of strut pressure data can be populated with data from the machine 10 itself and/or a number of machines 10, 10' having a payload distribution monitoring system 25 constructed according to principles of the present disclosure that includes at least one strut 30 with a corresponding pressure sensor 100.

In embodiments, the data storage device 108 includes a database of unbalanced loading condition events that can be organized within a plurality of geographic outline areas called map units. In embodiments, the worksite can be broken up into a plurality of contiguous map units and unbalanced loading condition events occurring within the worksite can be associated with one of the map units. The map unit data can include the number of unbalanced loading condition events that have occurred within the particular map unit and the date/time when each such unbalanced loading condition event occurred. The tracking module of the payload distribution monitoring program 105 can be configured to correlate the location of the machine 10 with one of the plurality of map units and to identify the payload hazard severity of the map unit within which the machine 10 is located based upon the number of unbalanced loading condition events occurring within the map unit and the timing of when those hazard events occurred.

In embodiments, the data storage device 108 can be adapted to store message data for use by the messaging module of the payload distribution monitoring program 105 in generating a message indicator and/or a warning indicator (such as in the form of at least one pop-up message). In embodiments, the data storage device 108 stores message data for a plurality of pop-up messages relating to loading condition event information.

In embodiments, to the extent that the machine 10 moves to a new location at which the particular loading conditions of the new location differ from the previous location, the payload distribution monitoring program 105 can update the loading condition data used by the payload distribution monitoring system 25 to determine the loading condition for the machine 10 at the new worksite. When the loading conditions at the worksite have changed significantly (such as by undergoing a reconfiguration or a remediation), the controller 104 can reset the information in the data storage device 108 to reflect the changed loading conditions at the worksite.

In response to a command received from the interface device 107, for example, the controller 104 can be used to display loading condition data stored in the data storage device 108 through the graphical user interface of the payload distribution monitoring program 105 via the interface device 107. The information in the data storage device 108 can be selectively transmitted to the operator 125 via the interface device 107 and/or to the off-board receiver 175 via the communication device 110.

The communication device 110 is in operable arrangement with the controller 104 to communicatively transmit information from the payload distribution monitoring system 25 to a suitable, off-board device, such as the receiver 175, for example. In embodiments, the communication device 110 is configured to transmit an unbalanced loading event signal from the controller 104 to the receiver 175, which is unsupported by the frame 12 of the machine 10.

In embodiments, the unbalanced loading event signal contains loading condition data from the payload distribution monitoring system 25. For example, in embodiments, the unbalanced loading event signal contains unbalanced loading event data indicating the occurrence of one or more unbalanced loading conditions and a time and place of occurrence for each such unbalanced loading condition.

In embodiments, the communication device 110 can comprise any suitable equipment that facilitates the transmission of data between the payload distribution monitoring system 25 and an off board device, such as the receiver 175 or a central computer system located remotely from the machine 10. In embodiments, the communication device 110 can include hardware and/or software configured to send and/or receive data through a wireless communication link 180 across a wireless networking platform such as, for example, a satellite communication system. Alternatively and/or additionally, the communication device 110 can include one or more broadband communication platforms configured to communicatively couple the payload distribution monitoring system 25 to an off board system, such as, for example, cellular, Bluetooth, microwave, point-to-point wireless, point-to-multipoint wireless, multipoint-to-multipoint wireless, or any other appropriate communication platform for networking a number of components.

In embodiments, the communication device 110 can be configured to establish a direct data link with an external data storage device. In embodiments, the external data storage device can be a part of the central computer system or in the form of a portable device for downloading the data from the payload distribution monitoring system 25 and uploading the information to the central computer system, for example. In embodiments, the communication device 110 can include a wired network, such as, for example, Ethernet, fiber optic, waveguide, or any other type of wired communication network.

In embodiments, the communication device 110 uses a cellular network to transmit hazard event data to the receiver 175 which is in the form of a smart phone having a mobile app loaded thereon to visibly display the hazard event data. In embodiments, the mobile app can be used to display the graphical user interface of the payload distribution monitoring system 25 on the smart phone 175 to allow a user to input commands to the payload distribution monitoring system 25 remotely using the smart phone 175 and to receive output therethrough in a manner similar to that using the interface device 107.

In embodiments, the central computer system/receiver 175 is configured to perform additional loading condition analysis remotely from the machine 10 and to transmit the additional loading condition data back to the payload distribution monitoring system 25 for further use in operating the machine 10. In addition, the central computer system/receiver 175 can be configured to monitor a fleet of machines at the worksite via a centralized processing unit.

Figure 7:
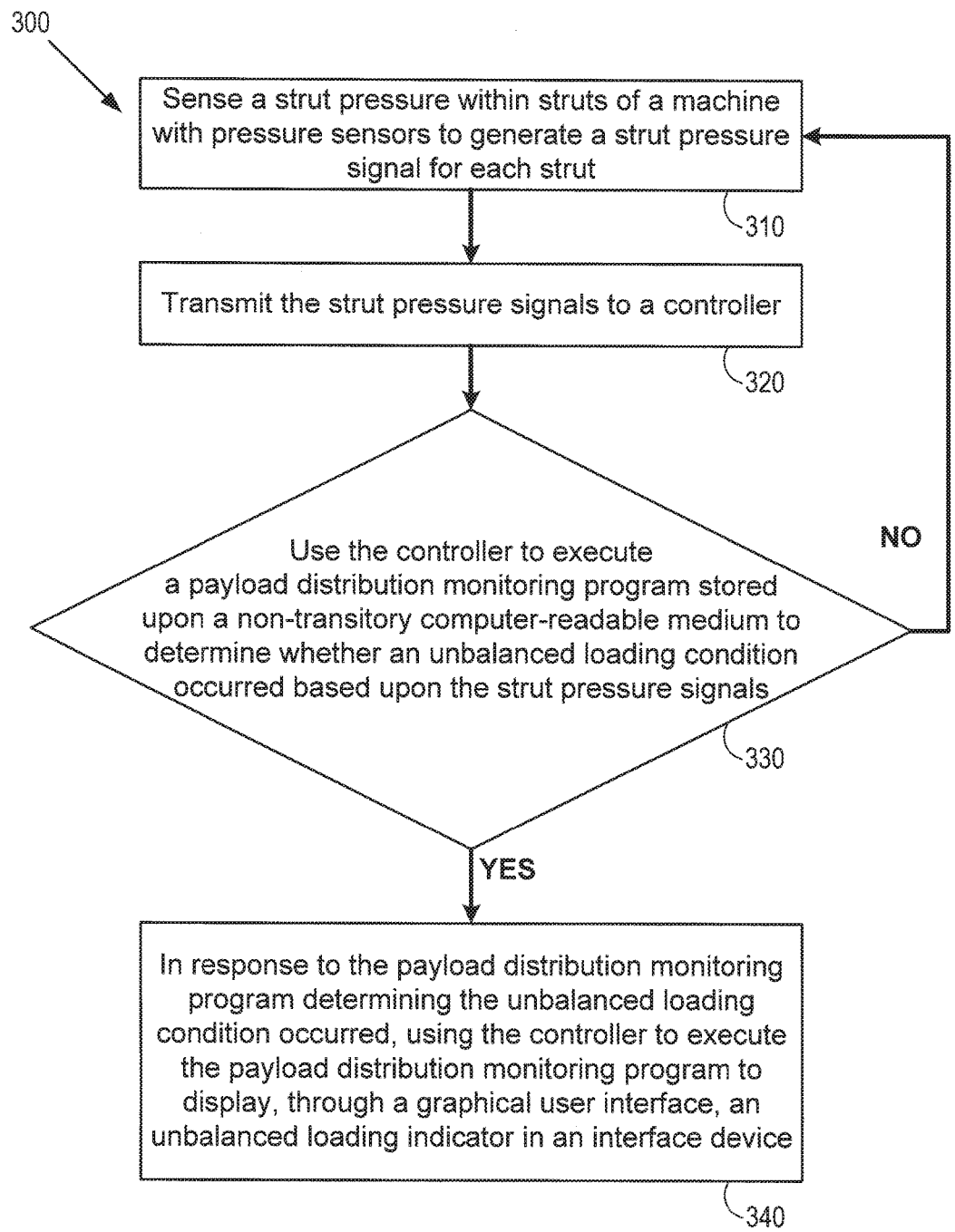
FIG. 7 is a flowchart illustrating steps of an embodiment of a method of monitoring a payload distribution of a machine at a worksite following principles of the present disclosure.

In embodiments, an embodiment of a machine including a payload distribution monitoring system constructed according to principles of the present disclosure can be used to carry out a method of monitoring a payload distribution of a machine in accordance with principles of the present disclosure to determine whether the machine has an unbalanced loading condition. Referring to FIG. 7, steps of an embodiment of a method 300 of monitoring a payload distribution of a machine following principles of the present disclosure are shown.

The method 300 of monitoring a payload distribution of a machine is used with a machine that includes a frame and a suspension system. The suspension system is mounted to the frame and includes a first front strut, a second front strut, a first rear strut, and a second rear strut. The method 300 includes sensing a strut pressure within each of the first front strut, the second front strut, the first rear strut, and the second rear strut with a respective one of a plurality of pressure sensors to generate a strut pressure signal indicative of the strut pressure sensed by the respective one of the plurality of pressure sensors (step 310). The strut pressure signal of each of the plurality of pressure sensors is transmitted to a controller (step 320).

The controller is used to execute a payload distribution monitoring program stored upon a non-transitory computer-readable medium to determine whether an unbalanced loading condition occurred based upon the strut pressure signal associated with each of the first front strut, the second front strut, the first rear strut, and the second rear strut (step 330). In embodiments, the payload distribution monitoring program determines whether the unbalanced loading condition occurred using any technique discussed above.

In response to the payload distribution monitoring program determining the unbalanced loading condition occurred, the controller is used to execute the payload distribution monitoring program to display, through a graphical user interface, an unbalanced loading indicator in an interface device indicating the unbalanced loading condition occurred (step 340). In embodiments, a method following principles of the present disclosure further includes using the controller to execute the payload distribution monitoring program to display, through the graphical user interface, a payload hazard-approaching warning message in the interface device indicating the machine is approaching a unbalanced loading condition event site in response to the machine being within a predetermined payload hazard distance from the historical unbalanced loading condition event site. In embodiments, the payload hazard-approaching warning message includes at least one of a visible image and an audible sound.

In embodiments of a method of monitoring a payload distribution of a machine in accordance with principles of the present disclosure, a geolocation unit can be operated to generate a location signal indicative of a location of the machine. The location signal can be transmitted to the controller. In embodiments, the geolocation unit comprises a GPS receiver that is configured to generate the location signal. In embodiments, the location signal includes a latitudinal position and a longitudinal position of the machine. In response to the payload distribution monitoring program determining the unbalanced loading condition occurred, the controller can be used to execute the payload distribution monitoring program to track the location of the machine when the unbalanced loading condition occurred.

In embodiments, the machine includes an operator compartment, and the interface device is mounted within the operator compartment. In embodiments, the method further includes displaying in the interface device, through the graphical user interface, a message containing loading condition data.

In embodiments of a method of monitoring a payload distribution of a machine in accordance with principles of the present disclosure, the machine includes a communication device that is in operable connection with the controller. The method of monitoring a payload distribution of a machine can further include using the controller to transmit an unbalanced loading event signal to a receiver via the communication device where the receiver is located off board of the machine. In embodiments, the unbalanced loading event signal contains strut pressure data and corresponding location data. In embodiments, the communication device uses a cellular network to transmit loading condition data generated by the machine to the receiver which is in the form of a central processing unit that is in communicative arrangement with a number of such machines at the worksite.

INDUSTRIAL APPLICABILITY

The industrial applicability of the embodiments of a machine, a payload distribution monitoring system, and a method of monitoring a payload distribution of a machine described herein will be readily appreciated from the foregoing discussion. The described principles are applicable to a variety of machines and worksite. Using principles of the present disclosure, the occurrence of one or unbalanced loading conditions of a machine can be determined based upon the actual environmental conditions encountered by the machine(s) at the worksite when in service.

Furthermore, worksite management can use the loading condition data generated by the machines incorporating a payload distribution monitoring system constructed according to principles of the present disclosure to identify operator mishandling of the machine, loading errors, and/or to improve the conditions of the haul roads at the worksite to reduce the negative impact upon the machines that can be caused by unbalanced loading conditions. A payload distribution monitoring system constructed according to principles of the present disclosure can be used to identify spotting problems of a loading machine used to place a supply of material within the dump body of a machine equipped with a system for monitoring a payload distribution of a machine constructed according to principles of the present disclosure. Workers can then take corrective action to mitigate the spotting error.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A machine comprising:
  a frame, the frame having a front end, a rear end in opposing relationship to the front end, a first side, and a second side in opposing relationship to the first side;
  a body, the body mounted to the frame, the body including a payload support surface defining a payload storage area configured to hold a supply of material therein;
  a suspension system, the suspension system mounted to the frame, the suspension system including a first front strut, a second front strut, a first rear strut, and a second rear strut, the first front strut and the second front strut disposed adjacent the front end of the frame and on the first side and the second side of the frame, respectively, and the first rear strut and the second rear strut disposed adjacent the rear end of the frame and on the first side and the second side of the frame, respectively, the first front strut, the second front strut, the first rear strut, and the second rear strut being placed in supporting relationship with the body to support the supply of material disposed within the body;
a payload distribution monitoring system, the payload distribution monitoring system supported by the frame and including:
 a plurality of pressure sensors, the plurality of pressure sensors respectively arranged with the first front strut, the second front strut, the first rear strut, and the second rear strut to sense a strut pressure therewithin, the plurality of pressure sensors each configured to generate a strut pressure signal indicative of the strut pressure sensed by the respective one of the plurality of pressure sensors,
 a non-transitory computer-readable medium, the non-transitory computer-readable medium bearing a payload distribution monitoring program, the payload distribution monitoring program including a graphical user interface,
 a geolocation unit, the geolocation unit configured to generate a location signal indicative of a location of the machine,
 a controller, the controller in operable communication with each of the plurality of pressure sensors to respectively receive the strut pressure signal therefrom, the controller in operable arrangement with the non-transitory computer-readable medium such that the controller is configured to execute the payload distribution monitoring program contained thereon, the controller in operable communication with the geolocation unit to receive the location signal therefrom,
 an interface device, the interface device in operable communication with the controller, the interface device configured to display the graphical user interface of the payload distribution monitoring program,
 wherein the payload distribution monitoring program includes a strut pressure monitoring module, a messaging module, and a tracking module, the strut pressure monitoring module configured to monitor for an unbalanced loading condition within the body based upon a relative strut pressure differential exceeding a differential limit, the strut pressure monitoring module being configured to compute the relative strut pressure differential using the strut pressure signal associated with each of the first front strut, the second front strut, the first rear strut, and the second rear strut, the messaging module being configured to display, through the graphical user interface, an unbalanced loading indicator in the interface device indicating that the unbalanced loading condition occurred once the relative strut pressure differential exceeds the differential limit, and the tracking module configured to track the location of the machine when the unbalanced loading condition occurred,
 wherein the controller is configured to transmit an unbalanced loading event signal, the unbalanced loading event signal containing strut pressure data, corresponding location data, and unbalanced loading event data indicating the unbalanced loading condition occurred and a time and place of occurrence for the unbalanced loading condition.

2. The machine according to claim 1, wherein the strut pressure monitoring module of the payload distribution monitoring program is configured to compute the relative strut pressure differential by at least determining a difference between a first sum of the strut pressure of two of the first front strut, the second front strut, the first rear strut, and the second rear strut and a second sum of the strut pressure of the other two of the first front strut, the second front strut, the first rear strut, and the second rear strut.

3. The machine according to claim 1, further comprising:
an operator compartment supported by the frame;
wherein the interface device is mounted within the operator compartment.

4. The machine according to claim 1, further comprising:
a ground-engaging system, the ground-engaging system mounted to the frame such that the suspension system is interposed between the frame and the ground-engaging system.

5. The machine according to claim 4, wherein the ground-engaging system includes a first front wheel, a second front wheel, a front axle, a first rear wheel, a second rear wheel, and a rear axle, the first front wheel and the second front wheel respectively disposed on the first side and the second side of the frame and both rotatably mounted to the front axle, the front axle disposed adjacent the front end of the frame, the first rear wheel and the second rear wheel respectively disposed on the first side and the second side of the frame and both rotatably mounted to the rear axle, the rear axle disposed adjacent the rear end of the frame, and wherein the suspension system is mounted to the frame such that the suspension system is interposed between the frame and the ground-engaging system, the first front strut and the second front strut interposed between the frame and the first front wheel and the second front wheel, respectively, and the first rear strut and the second rear strut interposed between the frame and the first rear wheel and the second rear wheel, respectively.

6. The machine according to claim 1, wherein the payload distribution monitoring system further includes a communication device, the communication device in operable arrangement with the controller to communicatively transmit the unbalanced loading event signal to a receiver unsupported by the frame.

7. A system for monitoring a payload distribution of a machine, the machine including a frame and a suspension system, the suspension system mounted to the frame and including a first front strut, a second front strut, a first rear strut, and a second rear strut, the system comprising:
 a plurality of pressure sensors, the plurality of pressure sensors adapted to be respectively arranged with the first front strut, the second front strut, the first rear strut, and the second rear strut to sense a strut pressure therewithin, the plurality of pressure sensors each configured to generate a strut pressure signal indicative of the strut pressure sensed by the respective one of the plurality of pressure sensors;
 a non-transitory computer-readable medium, the non-transitory computer-readable medium bearing a payload distribution monitoring program, the payload distribution monitoring program including a graphical user interface;
 a geolocation unit, the geolocation unit configured to generate a location signal indicative of a location of the machine;
 a controller, the controller in operable communication with each of the plurality of pressure sensors to respectively receive the strut pressure signal therefrom, the controller in operable arrangement with the non-transitory computer-readable medium such that the controller is configured to execute the payload distribution monitoring program contained thereon;

an interface device, the interface device in operable communication with the controller, the interface device configured to display the graphical user interface of the payload distribution monitoring program;

wherein the payload distribution monitoring program includes a strut pressure monitoring module, a messaging module, and a tracking module, the strut pressure monitoring module configured to monitor for an unbalanced loading condition within the machine based upon a relative strut pressure differential exceeding a differential limit, the strut pressure monitoring module being configured to compute the relative strut pressure differential using the strut pressure signal associated with each of the first front strut, the second front strut, the first rear strut, and the second rear strut, the messaging module being configured to display, through the graphical user interface, an unbalanced loading indicator in the interface device indicating that the unbalanced loading condition occurred once the relative strut pressure differential exceeds the differential limit, and the tracking module configured to track the location of the machine when the unbalanced loading condition occurred; and a data storage device, the data storage device in operable communication with the controller, the data storage device including a database of loading condition data for a worksite, the database of loading condition data including a set of unbalanced loading condition events and a set of payload hazard locations corresponding to the set of unbalanced loading condition events.

8. The system according to claim 7, wherein the strut pressure monitoring module of the payload distribution monitoring program is configured to compute the relative strut pressure differential by at least determining a difference between a first sum of the strut pressure of two of the first front strut, the second front strut, the first rear strut, and the second rear strut and a second sum of the strut pressure of the other two of the first front strut, the second front strut, the first rear strut, and the second rear strut.

9. The system according to claim 8, wherein the first sum comprises the strut pressure of the first front strut and the second front strut, and the second sum comprises the strut pressure of the first rear strut and the second rear strut.

10. The system according to claim 8, wherein the first sum comprises the strut pressure of the first front strut and the first rear strut, and the second sum comprises the strut pressure of the second front strut and the second rear strut.

11. The system according to claim 7, wherein the data storage device includes a database of loading condition data for a worksite, including a historical set of strut pressure data corresponding to a plurality of locations at the worksite; and wherein the differential limit used by the strut pressure monitoring module to determine whether the unbalanced loading condition has occurred is based upon the historical set of strut pressure data occurring at the location.

12. The system according to claim 11, wherein the machine comprises a first machine, and wherein the database of loading condition data includes data received from at least a second machine equipped with a corresponding second set of struts and a corresponding second set of pressure sensors.

13. The system according to claim 7, wherein the payload distribution monitoring program includes a mapping module, the mapping module being configured to generate a payload hazard map of the worksite using the database of loading condition data in the data storage device, the payload hazard map including a payload hazard indicator at each of the set of payload hazard locations for the set of unbalanced loading condition events.

14. The system according to claim 7, wherein the tracking module is configured to compare the location of the machine with the set of payload hazard locations to determine when the machine is within a predetermined payload hazard distance from at least one of the set of payload hazard locations, and the messaging module is configured to display, through the graphical user interface, a payload hazard-approaching indicator in the interface device indicating that the machine is approaching a hazardous area when the tracking module determines the machine is within the predetermined payload hazard distance.

15. A method of monitoring a payload distribution of a machine, the machine including a frame and a suspension system, the suspension system mounted to the frame and including a first front strut, a second front strut, a first rear strut, and a second rear strut, the method comprising:

sensing a strut pressure within each of the first front strut, the second front strut, the first rear strut, and the second rear strut with a respective one of a plurality of pressure sensors to generate a strut pressure signal indicative of the strut pressure sensed by the respective one of the plurality of pressure sensors;

transmitting the strut pressure signal of each of the plurality of pressure sensors to a controller;

using the controller to execute a payload distribution monitoring program stored upon a non-transitory computer-readable medium to determine whether an unbalanced loading condition occurred based upon the strut pressure signal associated with each of the first front strut, the second front strut, the first rear strut, and the second rear strut;

in response to the payload distribution monitoring program determining the unbalanced loading condition occurred, using the controller to execute the payload distribution monitoring program to display, through a graphical user interface, an unbalanced loading indicator in an interface device indicating the unbalanced loading condition occurred;

operating a geolocation unit to generate a location signal indicative of a location of the machine;

transmitting the location signal to the controller;

in response to the payload distribution monitoring program determining the unbalanced loading condition occurred, using the controller to execute the payload distribution monitoring program to track the location of the machine when the unbalanced loading condition occurred.

* * * * *